United States Patent [19]
Newburgh et al.

[11] 3,909,710
[45] Sept. 30, 1975

[54] MAGNETIC SURFACE WAVE ROTATION RATE SENSOR USING THE SAGNAC EFFECT

[75] Inventors: Ronald G. Newburgh, Belmont; Philipp Blacksmith, Concord; James C. Sethares, Waltham, all of Mass.

[73] Assignee: The United States of America as represented by the Secretary of the Air Force, Washington, D.C.

[22] Filed: Jan. 14, 1974

[21] Appl. No.: 433,179

[52] U.S. Cl............ 324/34 R; 73/505; 235/150.25; 324/83 A
[51] Int. Cl............................................. G01r 33/00
[58] Field of Search............ 324/34 R, 43 R, 83 A; 356/106 LR; 235/150.25; 73/505; 333/30 M

[56] References Cited
UNITED STATES PATENTS

| | | | |
|---|---|---|---|
| 3,395,270 | 7/1968 | Speller................. | 356/106 LR |
| 3,596,522 | 8/1971 | Ensley.................... | 73/505 |
| 3,657,927 | 4/1972 | Tyson..................... | 324/43 R |
| 3,681,687 | 8/1972 | Erben et al.............. | 324/83 A |
| 3,713,049 | 1/1973 | Desormiere............. | 333/30 M |

*Primary Examiner*—Robert J. Corcoran
*Attorney, Agent, or Firm*—Joseph E. Rusz; Willard R. Matthews, Jr.

[57] ABSTRACT

High sensitivity rotation rate measurement is accomplished by means of a magnetic surface wave Sagnac effect sensor. An annular or ring-shaped member constituting a magnetic surface transmission medium is combined with a closely proximate (but separate) electromagnetic wave/magnetic surface wave transducer. The annular member is in a fixed inertial frame and rotatable about its major axis. The transducer is in a fixed frame relative to rotation of the annular member and induces magnetic surface waves on the transmission medium in response to an electromagnetic wave input. A magnetic field producing means positioned in fixed relationship to the transmission medium effects both clockwise and counterclockwise flow of the magnetic surface waves. The transducer also produces electromagnetic wave signals in response to the clockwise and counterclockwise magnetic surface waves. Rotational movements of the annular member relative to the transducer effects a circulation time difference between the clockwise and counterclockwise magnetic surface waves. The resulting electromagnetic wave signals are detected and processed as a measure of the rotation rate of the annular member.

3 Claims, 7 Drawing Figures

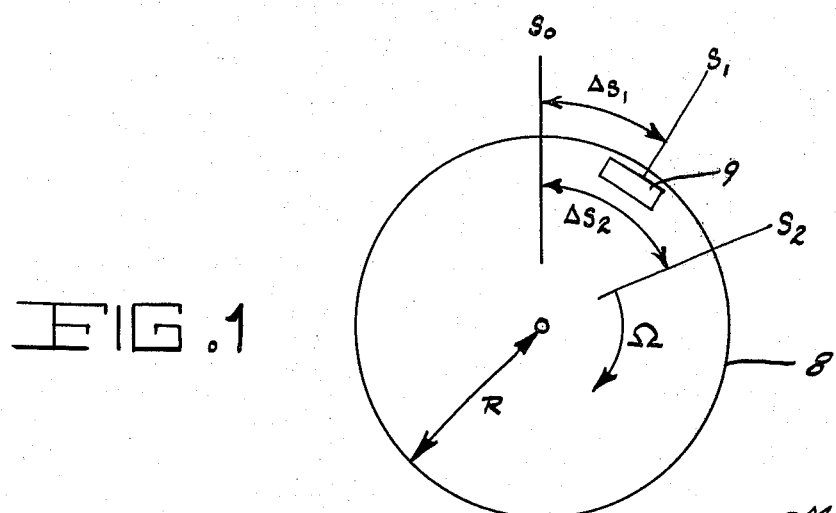
FIG. 1
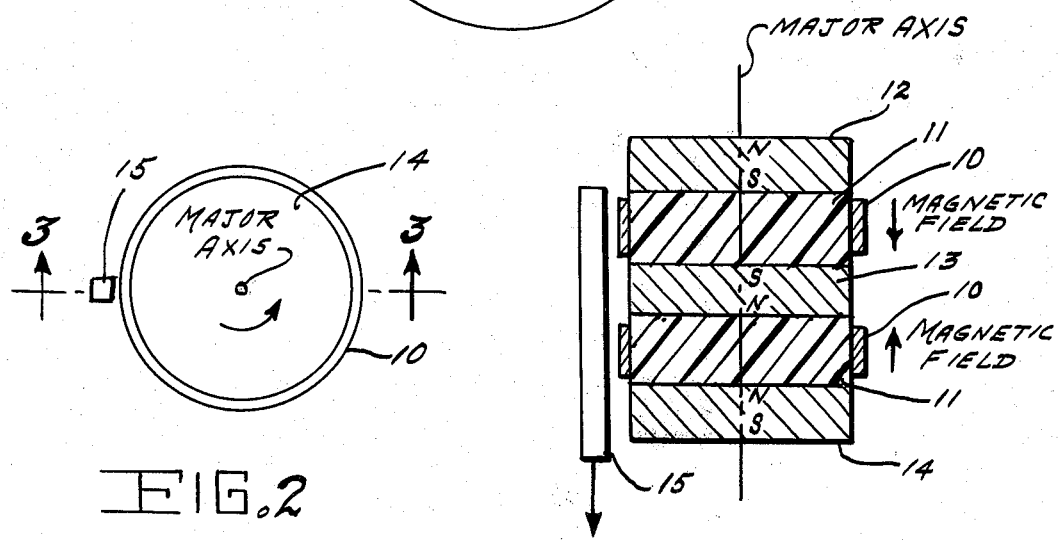
FIG. 2
FIG. 3
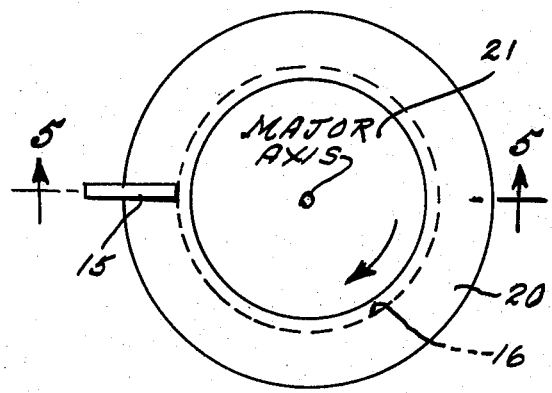
FIG. 4
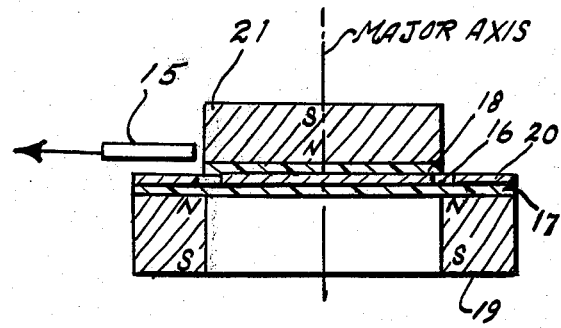
FIG. 5

MAGNETIC SURFACE WAVE ROTATION RATE SENSOR USING THE SAGNAC EFFECT

BACKGROUND OF THE INVENTION

This invention relates to rotation rate sensors, and in particular to Sagnac effect devices that operate by means of magnetic surface waves.

The Sagnac effect has been used as the basis of two closely related devices, each of which measures rotation rates. The two devices are the ring laser gyro and the ring interferometer. The effect expresses itself as the circulation time difference between two light beams traversing the ring in opposite directions.

The similar yet different approach to the problem comprehended by the present invention is realized by using magnetic surface waves. The similarity lies in the use of two waves circulating in opposite directions. The difference is the difference between light waves and magnetic surface waves. Light waves in vacuo do not propagate with the aid of a medium. The velocity of propagation is constant in all inertial frames of reference. This is not true for magnetic surface waves which do require a medium, the velocity of which must be considered in calculating the wave velocity in different frames of reference. A second difference between light waves and magnetic surface waves is the absolute magnitudes of their velocities. A megnetic surface wave travels approximately $10^3$ times more slowly than a light wave. Therefore the wavelength of a magnetic surface wave corresponding to a given frequency is $10^3$ times shorter than the wave length of a light wave corresponding to the same frequency.

It is just this difference in propagation velocities which suggests the possibility of constructing a magnetic surface wave Sagnac device with a corresponding increase in sensitivity as compared to optical Sagnac devices.

SUMMARY OF THE INVENTION

The rotation rate sensor comprehended by the present invention is a Sagnac effect type device in which the relative time displacements of clockwise and counterclockwise magnetic surface waves propagating around a rotatable annular substrate member are utilized to determine relative rotation between the substrate member and its supporting frame. The magnetic surface waves are generated and subsequently detected by an electromagnetic wave magnetic surface wave transducer. The transducer is closely proximate to the annular substrate member and in a fixed frame relative to its rotational motion.

It is a principal object of the invention to provide a new and improved rotation rate sensor.

It is another object of the invention to provide a Sagnac effect type rotation rate sensor that utilizes magnetic surface waves.

It is another object of the invention to provide a Sagnac effect type rotation rate sensor having greater sensitivity than currently available devices of that type.

These, together with other objects, features and advantages of the invention, will become more readily apparent from the following detailed description taken in conjunction with the accompanying drawings.

DESCRIPTION OF THE DRAWINGS

FIG. 1 is an illustration of the basic elements of an optical Sagnac effect rotation rate sensor;

FIG. 2 is a plan view of one embodiment of the invention;

FIG. 3 is a sectional view of the device of FIG. 2 taken 3—3;

FIG. 4 is a plan view of a second embodiment of the invention;

FIG. 5 is a sectional view of the device of FIG. 4 taken at 5—5;

DETAILED DESCRIPTION OF THE PREFERRED EMBODIMENT

Figure 6:
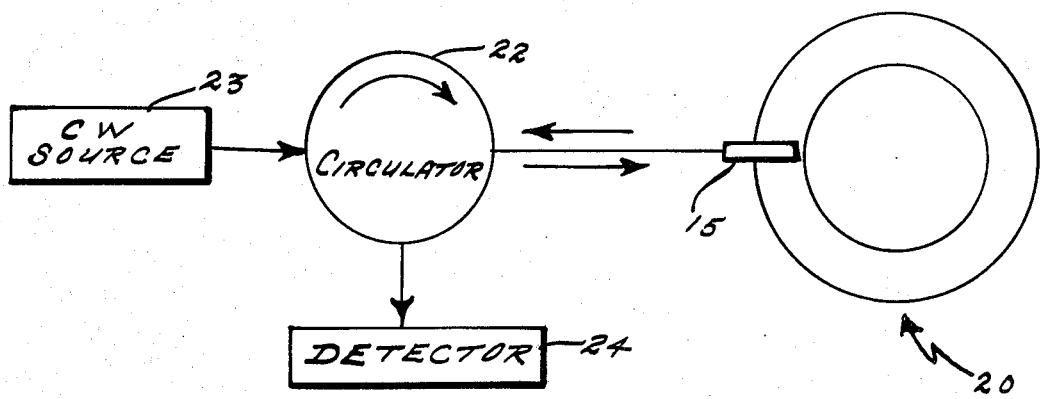
FIG. 6 is a block diagram of a signal processing circuit for the invention.

In order to demonstrate the analytical basis for the magnetic surface wave rotation rate sensor of the invention, it is necessary to first derive the basic equations governing the operation of optical Sagnac type devices.

To derive the Sagnac time difference consider a beam splitter 9 attached to a disk 8 of radius R, as shown in FIG. 1. Light is emitted at the beam splitter in both the clockwise (cw) and counterclockwise (ccw) directions. To simplify the derivation let both beams travel along a circular optical path of radius R. Let $S_o$ be the beam splitter position when the light is emitted, at time $t$ equals zero. The disk rotates with angular velocity $\Omega$ in an inertial frame K. All observations are to be made in this frame. The ccw beam returns to the splitter at positions $S_1$ at time $t_1$. The cw beam returns to the splitter at position $S_2$ at time $t_2$. Computation of $t_1$ and $t_2$ is as follows:

$$t_1 = (2 \pi R - \Delta S_1)/C = \Delta S_1 / \Omega R$$
$$t_1 = (2 \pi R / C) / (1 + \Omega R/C)$$
$$t_2 = (2 \pi R + \Delta S_2) / C = \Delta S_2 / \Omega R$$
$$t_2 = (2 \pi R / C) / (1 - \Omega R / C)$$
$$\Delta t = t_2 - t_1 = 4 A \Omega / C^2 [1 - (\Omega R / C)^2] \quad (1)$$

where $A = \pi R^2$. The velocity of propagation is taken to be a constant $c$ for the cw and ccw beam, since the frame of reference in inertial. This is in accordance with Einstein's second postulate. A fringe shift $\Delta Z$ can then be computed from Equation (1):

$$\Delta Z = c \Delta t / \lambda = 4 A \Omega / c \lambda [1 - (\Omega R / c)^2] \quad (2)$$

and a corresponding phase shift $\Delta \phi$.

$$\Delta \phi = 2 \pi \Delta Z = 8 \pi A \Omega c \lambda [1 - (\Omega R / c)^2]. \quad (3)$$

Equation (2) is used to describe the original Sagnac experiment and Equation (3) describes the polarization ring interferometer.

The ring laser differs from the interferometer. The ring contains an active lasing material which behaves as two independent oscillators. When the ring is stationary ($\Omega = 0$), the two oscillators are at the same frequency. When the ring rotates, the paths for the two beams are different and a beat frequency is observed. The shift in frequency $\Delta \nu$ is related to the path diference $\Delta p$ as $$\Delta \nu / \nu = \Delta p / p.$$

$\Delta t$ of Equation (2) is used to compute $\Delta p$, $$\Delta p = c \Delta t$$

and $$p = 2 \pi R.$$

Therefore $$\Delta \nu = \nu (c\Delta t/2\pi R) = \frac{\nu c \lambda \pi R^2 \Omega}{2\pi Rc^2} [1 - (\Omega R/c)^2] \quad (4)$$
$$= 2R\Omega/\lambda \ [1 - (\Omega R/c)^2]$$

To the first order Equations (2), (3) and (4) can be written as $$\Delta Z \sim 4 A \Omega / c \lambda \quad (2')$$

$$\Delta \phi \sim 8\pi A \Omega / c \lambda \quad (3')$$

$$\Delta \nu \sim 2 R \Omega / \lambda \quad (4')$$

A fringe sensitivity, $S_Z$, can then be defined as the fringe shift radian per second as a phase sensitivity; $S\phi$ as the phase shift per radian per second; and as a frequency sensitivity, $S\nu$, as the frequency shift per radian per second.

$$\Delta Z = S_z \Omega; \ S_z = 4 A / c \lambda \quad (5)$$

$$\Delta \phi = S\phi \ \Omega; \ S\phi = 8 \pi A / c \lambda \quad (6)$$

$$\Delta \nu = S\nu \ \Omega; \ S\nu = 2 R / \lambda \quad (7)$$

$S_Z$ and $S\phi$ are both directly proportional to area and inversely proportional to the product $c \lambda$, whereas $S \nu$ is proportional to radius and inversely proportional to wavelength alone. This arises because fringe shifts and phase shifts are represented by dimensionless quantities unlike frequency which is an inverse time. It is also quite obvious that any way in which one could decrease velocity $c$ and wavelength $\lambda$ would increase both fringe and phase sensitivity accordingly. A decrease in wavelength would increase frequency sensitivity correspondingly. This analysis initiated the consideration of magnetic surface waves for a possible magnetic surface wave interferometer and constituted the basic concept of the present invention.

As indicated above, magnetic surface waves propagate with a velocity smaller than that of light by a factor of $10^3$. As a consequence a magnetic surface wave of the same frequency as an electromagnetic save has a wavelength which is also $10^3$ times shorter. The product ($\lambda c_l$) for 6,000 A light is ($\lambda c_l$) $\sim 2 \times 10^6$ cm$^2$/sec whereas for a magnetic surface wave of frequency $10^9$ Hz the product is $$(\lambda c_a) \sim 10^6 \text{ cm}^2/\text{sec}.$$

Hence, for rings of the same area $S \phi$ for $10^9$ Hz magnetic surface waves would be about the same as the $S\phi$ for 6,000 A light, provided the magnetic Sagnac effect exists. Accordingly, the advantages to be gained in miniaturization, ease of construction and elimination of optical components would make a system utilizing magnetic surface waves more valuable than optical devices.

To show that a one-to-one correspondence between magnetic surface waves and light waves does not exist, consider the situation sketched in FIG. 1. Let beam splitter 9 now represent a transducer mounted on the disk 8 (disk 8 in this instance comprising a magnetic surface wave transmission medium). At time $t$ equals zero magnetic surface waves are generated which will propagate in the cw and ccw directions. The disk rotates as before with angular velocity $\Omega$ in the cw direction as seen by an inertial observer in K. Let $c$ be the magnetic surface wave velocity of propagation with respect to the disk. However, every point on the disk's circumference moves with velocity $\Omega R$ in the cw direction. This is the motion of the medium. Therefore as measured in $K$ the ccw beam propagates with velocity $c - \Omega R$ and the cw beam with velocity $c + \Omega R$. The ccw beam returns to the transducer at position $S_1$ at time $t_1$ and the cw beam returns to the transducer at position $S_2$ at time $t_2$. These times are $$t_1 = (2 \pi R - \Delta S_1) / (c - \Omega R) = \Delta S_1 / \Omega R$$
$$t_1 = 2 \pi R / c$$

and $$t_2 = (2 \pi R + \Delta S_1) / (c + \Omega R) = \Delta s_1 / \Omega R$$
$$t_2 = 2 \pi R / c.$$

Hence there is no time difference between the two beams and no effect. This is a consequence of the non-constancy of magnetic surface wave propagation velocity.

However, a different arrangement (the arrangement comprehended by the invention) does predict a result. This arrangement requires separation of the transducer from the disk so that the transducer is at rest in the inertial frame while the disk rotates. (An equivalent arrangement would be for the disk to be at rest in the inertial frame while the transducer rotates about it.) This arrangement is physically possible because a transducer need not be in intimate contact with the material to be able to generate surface waves on the material. If the transducer is positioned at the top of the disk but separated from it, that position is fixed in the inertial frame, although the disk rotates underneath it. Each beam must follow the path $2 \pi R$ in inertial space. The ccw beam requires time $t_1$, $$t_1 = 2 \pi R / (c - \Omega R)$$

and the cw beam requires time $t_2$, $$t_2 = 2 \pi \mathbf{R} / (c + \Omega R)$$

(Note that $t_1$ is now greater than $t_2$.)

The time difference is $$\Delta t = t_1 - t_2 = 4 A \Omega / c^2 [1 - (\Omega R / c)^2] \quad (8)$$

with a corresponding fringe shift $$\Delta Z = c \Delta t / \lambda = 4 A \Omega / c \lambda [1 - (\Omega R /c)^2] \quad (9)$$

and phase shift $$\Delta \phi = 2 \pi \Delta Z = 8 \pi A \Omega / c \lambda [1 - (\Omega R / c)^2] \quad (10)$$

The fringe and phase sensitivities for the first order approximation are $$S_Z = 4 A / c \lambda \quad (11)$$

and $$S \phi = 8 \pi A/c\lambda. \quad (12)$$

Equations (8) through (12) are therefore formally identical with Equations (1), (2), (3), and (5) and (7).

However, the $c$ and $\lambda$ now refer to the magnetic surface wave. The sensitivities $S_Z$ and $S\phi$ are now considerably greater.

The design equations for a magnetic surface wave device are as follows:

$$\text{Dispersion Relation } \left(\frac{\omega}{\gamma}\right)^2 = H^2 + (4\pi M)H + \frac{1}{4}(4\pi M)^2\{1-\exp(-2kS)\} \qquad (13)$$

$$\text{Group Velocity } v_g = \frac{\gamma^2(4\pi M)^2 S}{4\omega} \exp(-2ks) \qquad (14)$$

$$\text{Phase Velocity } v_p = \frac{\gamma}{K}\sqrt{H^2+(4\pi M)H+\frac{1}{4}(4\pi M)^2\{1-\exp(-2ks)\}} \qquad (15)$$

$$\text{Wavelength } \lambda = \frac{-4\pi S}{\ln\left[-\frac{(\psi/\gamma)^2-H^2-H(4\pi M)}{\frac{1}{4}(4\pi M)^2}+1\right]} \qquad (16)$$

Wherein:
$H$ = applied field in oersteads
$4\pi M$ = saturation magnetization
$k$ = wave number $(cm^{-1}) = 2\pi/\lambda$
$S$ = thickness of film (transmission medium)
$\gamma$ = gyromagnetic ratio = $2\pi(2.8 \times 10^6)$ rad/oe.

Typical values for a magnetic surface wave device having a 3.8 $\mu$ thick yttrium iron garnet transmission medium and operating at 4 GHz are as follows:
$S = 3.8 \mu$
$4\pi M = 1{,}750$ Gauss
$f = 4$ GHz
$H = 615$ oe
$\lambda = .033$ mm
$k = 1{,}912$ cm$^{-1}$
$v_g = 8.4 \times 10^5$ cm/sec
$v_p = 1.3 \times 10^7$ cm/sec.

To use such a device as an inertial rotation rate sensor requires relative motion between the disk and the transducer. Accordingly, the present invention comprehends a device in which the ring is at rest in an inertial frame (defined by the fixed stars) and the transducer is at rest in the rotating frame. The disk is then regarded as supporting a standing wave in inertial space, the energy density of which is sampled by the transducer moving along the pattern. This is analogous to the mechanical gyroscope. The rotor is supported in an (ideally) torqueless, frictionless mount and set spinning. Its angular momentum vector is then fixed in inertial space. When observed in the rotating frame (in which the mount is at rest) the angular momentum vector changes direction. This change is a measure of the rotation with respect to the inertial frame.

By using a mechanical mount of this type for the disk (or even a magnetic suspension), the disk preserves its direction in inertial space. This can be assured by spinning the disk at some definite rate. Such a spin provides a reference signal for the interferometer. Subsequent rotation of the system will change the relative motion between transducer and disk and thus change the reference signal. This change provides the rotation sensing.

Referring now to FIGS. 2 and 3, there is illustrated thereby a rotation rate sensor incorporating the principles of the invention. It comprises annular members 10, disk substrate member 11, magnetic field producing means 12, 13, and 14, and transducer 15. Annular members 10 are preferably a ferrimagnetic film such as yttrium iron garnet. Substrate members 11 are of an insulating material such as gadolinium gallium garnet or other suitable material having an atomic lattice structure that matches that of the ferrimagnetic ring. The magnetic field producing means and permanent magnets such as samarium cobalt magnets that are poled in the manner noted in FIG. 3 to provide uniform magnetic fields that cause clockwise flow of magnetic surface waves on one annular member 10 and counterclockwise flow on the other. Transducer 15 is a microstrip line probe. The field of magnetostatic surface wave technology to which the present invention pertains is well known and details relating to specific structures can be obtained from published literature. For example, the publication Low Loss Magnetostatic Surface Waves at Frequencies Up to 15 GHz, by J. Bradford Merry and James C. Sethares, published in IEEE Transactions on Magnetics, Vol. Mag. -9, No. 3, September 1973, and the bibliography contained therein is representative of such magnetostatic surface wave technology.

An alternative embodiment of the invention is illustrated by FIGS. 4 and 5. In this case the magnetic surface wave transmission medium comprises the circular domain wall established in a ferrimagnetic sheet by the magnetic field producing means. Ferrimagnetic member 20 is positioned between cylindrical magnet 21 and annular magnet 19 and insulated therefrom by insulating members 17 and 18. The polarization of magnets 19 and 21 is such that a circular domain wall 16 is established in the ferrimagnetic material. Magnetic surface waves induced by transducer 15 travel in both clockwise and counterclockwise directions along the domain wall.

The magnetic surface wave generation schemes disclosed herein are therefore bidirectional. They inherently function as beam splitters and the output in each instance will represent the combination of signals which have traveled in the two opposite senses around the circumference of the annular member. The initial exciting signal will also be present and must be removed. If operation is in the cw mode, this can be done by use of a circulator to distinguish the two signals, however only a limited amount of isolation can be obtained in this way. If it should prove inadequate, much better isolation can be obtained by use of pulse technique, taking advantage of the time delay inherent in the magnetic propagation to allow gating of the required signal only.

FIG. 6 illustrates a circuit suitable for cw mode of operation. A cw electromagnetic wave source 23 supplies transducer 15 through circulator 22. The output signals from the transducer are returned through circulator 22 to detector 24 where they are processed as a measure of rate of rotation of annular member 20.

Figure 7:
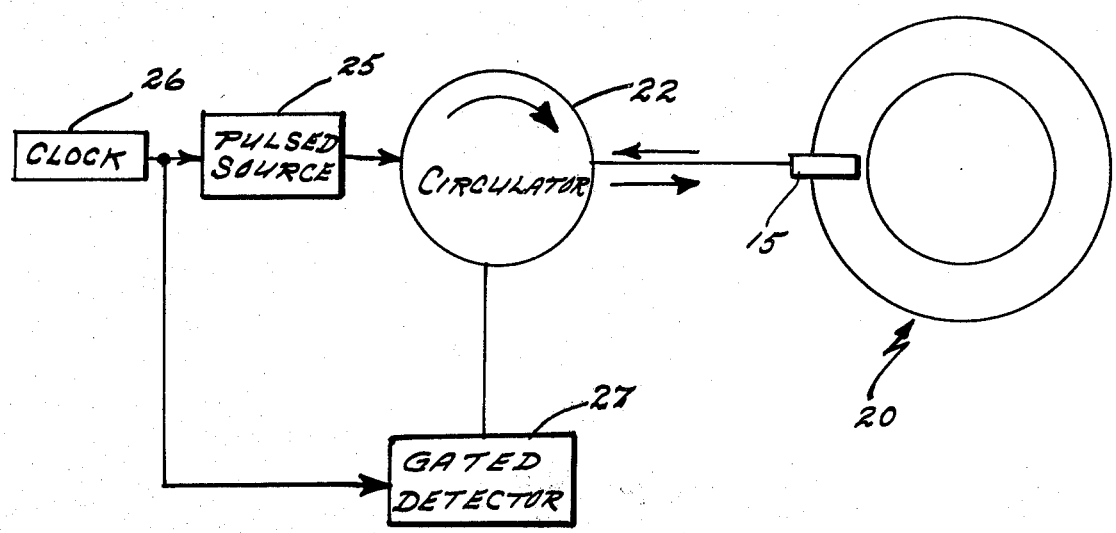
FIG. 7 is a block diagram of an alternative signal processing circuit for the invention.

Pulsed operation is accomplished by means of the circuit of FIG. 7. Pulsed electromagnetic wave source 25 supplies transducer 15 through circulator 22. Gated detector 27 processes this output pulse from the transducer as they are returned through the circulator 22. Clock 26 controls both pulsed source 25 and gated detector 27. Conventional signal processing techniques are used in each instance and the choice of signal processing circuits is determined by the requirements of the particular application.

While the invention has been described in terms of its preferred embodiments, it is understood that the words which have been used are words of description rather than words of limitation and that changes within the purview of the appended claims may be made without departing from the scope and spirit of the invention in its broader aspects.

What is claimed is:

1. A magnetic surface wave rotation rate sensor comprising an annular magnetic surface wave transmission medium, said transmission medium being rotatable about its major axis and in a fixed inertial frame, magnetic field producing means positioned in fixed relationship to said transmission medium and adapted to induce clockwise and counterclockwise flow of magnetic surface waves propagating thereon, transducer means positioned in close proximity to said transmission medium and being in a fixed frame relative to rotation thereof, said transducer means being adapted to generate magnetic surface waves on said transmission medium in response to an electromagnetic wave input and to generate first and second electromagnetic wave output signals in response to clockwise and counterclockwise magnetic surface waves propagating on said transmission medium, a source of electromagnetic wave energy connected to said transducer means, and detector means connected to said transducer means adapted to process said first and second electromagnetic wave output signals as a measure of relative motion between said transmission medium and said transducer means.

2. A magnetic surface wave rotation rate sensor as defined in claim 1 wherein said magnetic surface wave transmission medium comprises first and second juxtaposed concentric bands of ferrimagnetic material.

3. A magnetic surface wave rotation rate sensor as defined in claim 1 wherein said magnetic surface wave transmission medium comprises a circular domain wall defined in a ferrimagnetic sheet member by said magnetic field producing means.

* * * * *